US008240562B2

(12) United States Patent
Washiro

(10) Patent No.: US 8,240,562 B2
(45) Date of Patent: Aug. 14, 2012

(54) COMMUNICATION APPARATUS, COMMUNICATION METHOD, ANTENNA MODULE AND COMMUNICATION SYSTEM

(75) Inventor: Takanori Washiro, Kanagawa (JP)

(73) Assignee: Sony Corporation, Tokyo (JP)

( * ) Notice: Subject to any disclaimer, the term of this patent is extended or adjusted under 35 U.S.C. 154(b) by 894 days.

(21) Appl. No.: 12/266,702

(22) Filed: Nov. 7, 2008

(65) Prior Publication Data

US 2009/0121949 A1 May 14, 2009

(30) Foreign Application Priority Data

Nov. 9, 2007 (JP) ................................ P2007-292586

(51) Int. Cl.
*G06K 5/00* (2006.01)

(52) U.S. Cl. ........................................ 235/382; 235/492

(58) Field of Classification Search .................. 235/382, 235/492
See application file for complete search history.

(56) References Cited

FOREIGN PATENT DOCUMENTS

| | | |
|---|---|---|
| JP | 63-25573 | 2/1988 |
| JP | 4-500896 | 2/1992 |
| JP | 4-101168 | 4/1992 |
| JP | 7-86994 | 3/1995 |
| JP | 7-275694 | 10/1995 |
| JP | 9-120957 | 5/1997 |
| JP | 9-325726 | 12/1997 |
| JP | 11-66251 | 3/1999 |
| JP | 2003-500964 | 1/2003 |
| JP | 2006-85552 | 3/2006 |
| JP | 2006-303748 | 11/2006 |

OTHER PUBLICATIONS

English-language translation of Japanese Office Action dated Oct. 7, 2009, in JP 2007-292586.

*Primary Examiner* — Kristy A Haupt

(74) *Attorney, Agent, or Firm* — Finnegan, Henderson, Farabow, Garrett & Dunner, L.L.P.

(57) ABSTRACT

A communication apparatus has a first communication section which makes contactless communication by means of magnetic field coupling and a second communication section which makes contactless communication by means of electric field coupling, and the second communication section generates an electric field which oscillates to a direction approximately parallel with an oscillation direction of a magnetic field on a position where the magnetic field crosses the second communication section.

8 Claims, 12 Drawing Sheets

COMMUNICATION APPARATUS, COMMUNICATION METHOD, ANTENNA MODULE AND COMMUNICATION SYSTEM

CROSS REFERENCES TO RELATED APPLICATIONS

The present invention contains subject matter related to Japanese Patent Application JP 2007-292586 filed in the Japan Patent Office on Nov. 9, 2007, the entire contents of which being incorporated herein by reference.

BACKGROUND OF THE INVENTION

1. Field of the Invention

The present invention relates to a communication apparatus, a communication method, an antenna module and a communication system.

2. Description of the Related Art

In recent years, communication apparatuses such as contactless IC cards and RFID (Radio Frequency identification) which make contactless communication are widely used. The communication apparatuses have, for example an antenna coil, and make contactless communication by means of magnetic field coupling using an AC magnetic field in the antenna coil. The magnetic field coupling by means of such a communication apparatus is suitable for the contactless communication such as proximity communication at a close distance.

The communication apparatus which can be used in the contactless IC cards are formed so as to be thin and small because they are mounted into the cards.

SUMMARY OF THE INVENTION

On the other hand, in recent years, more amount of data is desired to be transmitted/received at a higher speed. In some cases, communication apparatuses (composite radio) which transmit/receive different data simultaneously by means of a plurality of communication systems (for example, a plurality of communication lines, or a plurality of communication systems) are desired.

Therefore, when a plurality of communication systems is tried to be incorporated into a communication apparatus such as a contactless IC card, antennas corresponding to the plurality of communication systems should be arranged in one communication apparatus. In the communication apparatus into which a plurality of communication systems is incorporated, the antennas of the communication systems in the communication apparatus are coupled (for example, magnetic field coupling in the antenna coil such as a loop antenna), and interference due to this coupling becomes an issue.

The influence (for example, noise) due to the interference is more noticeable as the distance between the antennas in one communication apparatus is shorter. Therefore, when the distance between the antennas is lengthened in order to repress the influence due to the interference, the miniaturization of the communication apparatus might be inhibited. On the other hand, in some cases, it is difficult to sufficiently lengthen the distance between the antennas due to design constraint of the communication apparatus main body.

It is considered that a useful frequency in the respective communication systems is changed and a filter is used for eliminating noises, but even such a method has a limit to repress the influence due to the interference.

Portable electronic devices such as notebook computers and mobile phones are mounted with a plurality of wireless systems based on various standards, and thus the interference due to the coupling of antennas becomes increasingly an issue.

The issue of the interference do to the coupling of the antennas concretely includes the following two points. That is to say, the first issue is such that a transmission signal of an antenna of one system in a communication apparatus on a transmission side is received by an antenna of another system in a communication apparatus on a reception side. The received signal becomes a noise for a reception signal of the antenna in another system and deteriorates an S/N ratio so as to inhibit communication (hereinafter, "the issue of S/N ratio"). The second issue is that an operation of one antenna prevents an operation of the other antenna in one communication apparatus so that antenna efficiency is deteriorated (hereinafter, the issue of the antenna efficiency). That is to say, according to the second issue, an antenna of the other system is arranged near the antenna, the performance of this antenna is deteriorated, and a gain is deteriorated so that a reception power becomes weak.

Therefore, it is desirable to provide new and improved communication apparatus, communication method, antenna module and communication system which have a plurality of communication systems, and are capable of reducing interference caused between the communication systems and handling contactless communication.

According to an embodiment of the present invention, there is provided a communication apparatus including: a first communication section which makes contactless communication by means of magnetic field coupling; and a second communication section which is arranged in a magnetic field generated by the first communication section and makes contactless communication by means of electric field coupling wherein the second communication section generates an electric field which oscillates to a direction approximately parallel with an oscillation direction of the magnetic field on a position where the magnetic field crosses the second communication section.

According to this constitution, when the communication apparatus transmits data, the first communication section generates a magnetic field so as to be capable of making contactless communication by means of magnetic field coupling. The second communication section generates an electric field so as to be capable of making contactless communication by means of electric field coupling. At this time, since the second communication section is arranged in the magnetic field generated by the first communication section, the magnetic field generated by the first communication section crosses the second communication section. Further, the second communication section generates the magnetic field which oscillates to a direction parallel with an oscillation direction of the magnetic field on the crossing position. The "approximately parallel" does not mean "completely parallel" but means to be parallel to a level that interference between the electric field of the electric field coupling and the magnetic field of the magnetic field coupling can be ignored in the contactless communication, namely, to be parallel to a level of being parallel in the contactless communication (the same holds for the following).

A change in the electric field is basically accompanied by a change in the magnetic field, and the oscillation direction of the magnetic field is vertical to the electric field oscillation direction. Magnetic fields or electric field whose oscillation directions have matched components interfere with each other. Therefore, the electric field and the magnetic field whose oscillation directions are vertical to each other interfere with each other. These interferences influence the electric field coupling or the magnetic field coupling. On the contrary, the magnetic field and the electric field whose oscillation directions are vertical to each other will be difficult to interfere with each other, and similarly the electric field and the magnetic field whose oscillation directions are parallel with each other will be difficult to interfere with each other.

In the communication apparatus having the above constitution, the magnetic field oscillation direction generated on a position where the magnetic field generated by the first communication section crosses the second communication section is parallel with the oscillation direction of the electric field generated by the second communication section. Therefore, the communication apparatus can make the interference between the magnetic field generated by the first communication section and the electric field generated by the second communication section difficult.

The first communication section has an antenna coil which couples the magnetic field, and the second communication section has a flat-shaped electric field coupling electrode which couples the electric field. The electric field coupling electrode may be arranged so that at least one part of magnetic flux generated by the antenna coil crosses the electric field coupling electrode vertically.

According to this constitution, the magnetic field (namely, magnetic flux for the magnetic field coupling can be generated by the antenna coil. Further, the electric field for the electric field coupling can be generated by the electric field coupling electrode. At this time, the flat-shaped electric field coupling electrode can generate at least an electric field which oscillates from one surface to a direction vertical to one surface. Further, at least a part of the magnetic flux generated by the antenna coil crosses vertically to the electric field coupling electrode. Therefore, the oscillation direction of the electric field generated by the electric field coupling electrode becomes parallel with the direction of the magnetic flux near the electric field coupling electrode. The word “vertical” does not mean “completely vertical”, but means vertical to a level that the interference between the electric field of the electric field coupling and the magnetic field of the magnetic field coupling can be ignored in the contactless communication, namely, vertical to a level of being vertical in the contactless communication (the same holds for the following).

The antenna coil and the electric field coupling electrode may be arranged on an approximately same plane.

According to this constitution, the oscillation direction of the magnetic field on the position where the magnetic field generated by the antenna coil crosses the electric field coupling electrode can be parallel with the oscillation direction of the electric field generated by the electric field coupling electrode. “The same plane” does not mean “completely same plane” but means “same plane to a level that the interference between the electric field of the electric field coupling and the magnetic field of the magnetic field coupling can be ignored in the contactless communication, namely, same plane to a level of the same plane in the contactless communication (the same holds for the following).

The electric field coupling electrode may be arranged on a center of the antenna coil.

The magnetic field generated by the antenna coil becomes weaker to wards the center of the antenna coil. Therefore, when the electric field coupling electrode is arranged on the center of the antenna coil where the magnetic field generated by the antenna coil becomes weak, the influence of the magnetic field generated by the antenna coil over the electric field coupling electrode can be further reduced. Since the electric field coupling electrode can be housed in the loop of the antenna coil, the communication apparatus can be miniaturized.

The electric field coupling electrode may have slits formed radially from its center.

According to this constitution, generation of an eddy current due to magnetic flux crossing the electric field coupling electrode is made to be difficult.

The first communication section may receive authentication data for authenticating a communication apparatus as a communication partner from the communication apparatus as the communication partner, and the second communication section may transmit predetermined data to the communication apparatus as the communication partner according to the authentication data.

According to his constitution, security of communication with the communication apparatus as a communication partner is heightened, and data can be transmitted efficiently.

According to another embodiment of the present invention, there is provided a communication method including the steps of: generating a magnetic field in order to make contactless communication by means of magnetic field coupling; generating an electric field in the magnetic field in order to make contactless communication by means of electric field coupling; and generating the electric field so that the electric field oscillates to a direction approximately parallel with an oscillation direction of the magnetic field on a generation position of the electric field.

According to this constitution, interference between the electric field for the electric field coupling and the magnetic field for the magnetic field coupling can be repressed.

According to another embodiment of the present invention, there is provided an antenna module including: an antenna coil which makes contactless communication by means of magnetic field coupling; and an electric field coupling electrode which is arranged in a magnetic field generated by the antenna coil and makes contactless communication by means of electric field coupling; wherein the electric field coupling electrode generates the electric field which oscillate to a direction approximately parallel with an oscillation direction of the magnetic field on a position where the magnetic field crosses the electric field coupling electrode.

According to this constitution, the interference between the electric field for the electric field coupling and the magnetic field for the magnetic field coupling can be repressed.

According to another embodiment of the present invention, there is provided A communication system including: two communication apparatuses which have a first communication section which makes contactless communication due to magnetic field coupling and a second communication section which makes contactless communication by means of electric field coupling, wherein in the communication apparatus on a transmission side: the first communication section generates a magnetic field in order to couple the magnetic field; and the second communication section is arranged in the magnetic field generated by the first communication section and generates an electric field which oscillates to a direction approximately parallel with an oscillation direction of the magnetic field on a position where the magnetic field crosses the second communication section.

According to this constitution, the interference between the electric field for the electric field coupling and the magnetic field for the magnetic field coupling can be repressed.

According to the embodiments of the present invention described above, a plurality of communication systems is provided, and the interference caused between the communication systems is reduced so that contactless communication can be made.

DETAILED DESCRIPTION OF THE PREFERRED EMBODIMENTS

Figure 1:
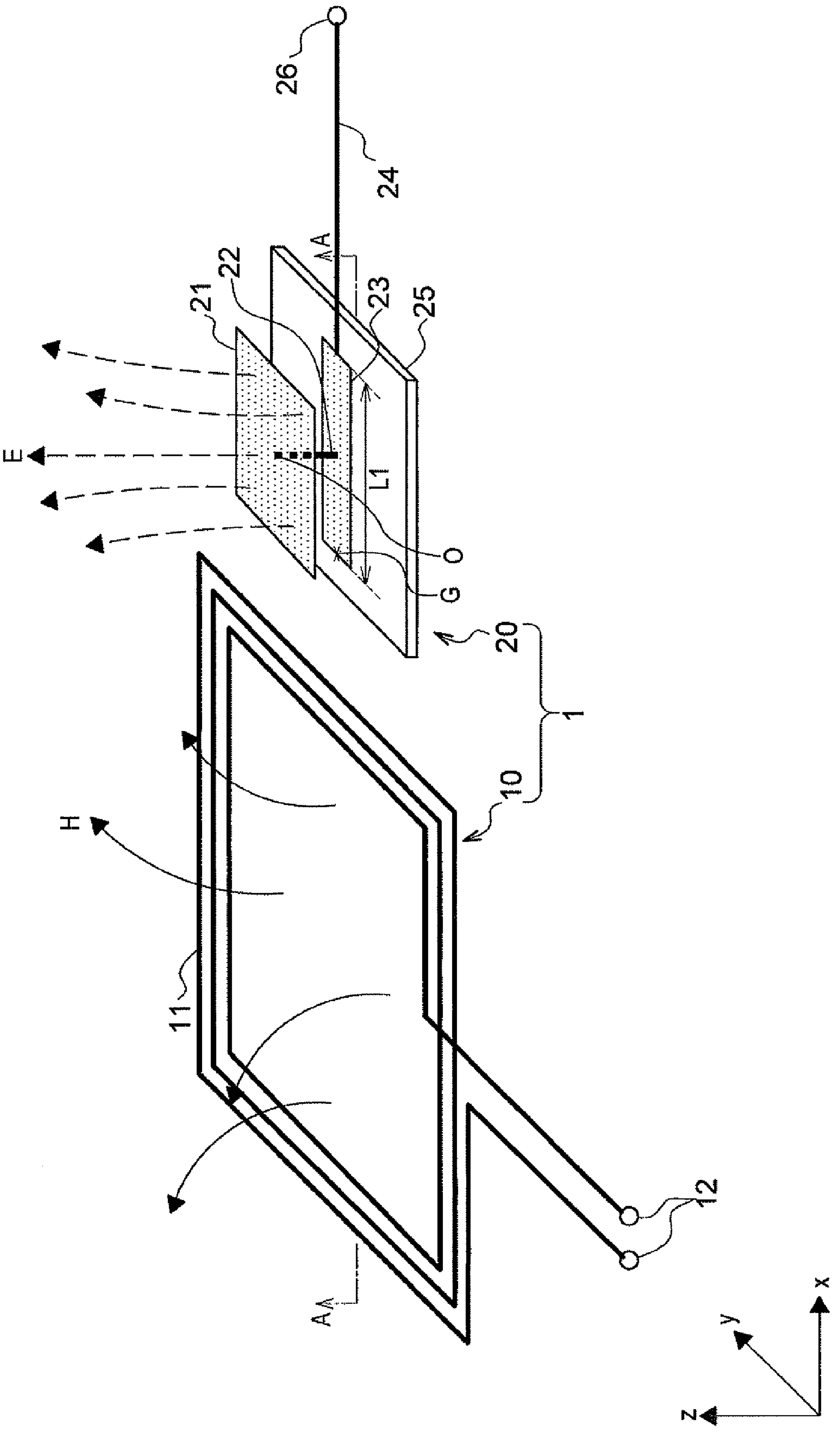
FIG. 1 is an explanatory diagram illustrating a constitution of a communication apparatus according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Before a communication apparatus and the like according to embodiments of the present invention is described, the issue of the S/N ratio and the issue of the antenna efficiency are described with reference to FIG. 11. The issue of the antenna efficiency is firstly described below.

Figure 11:
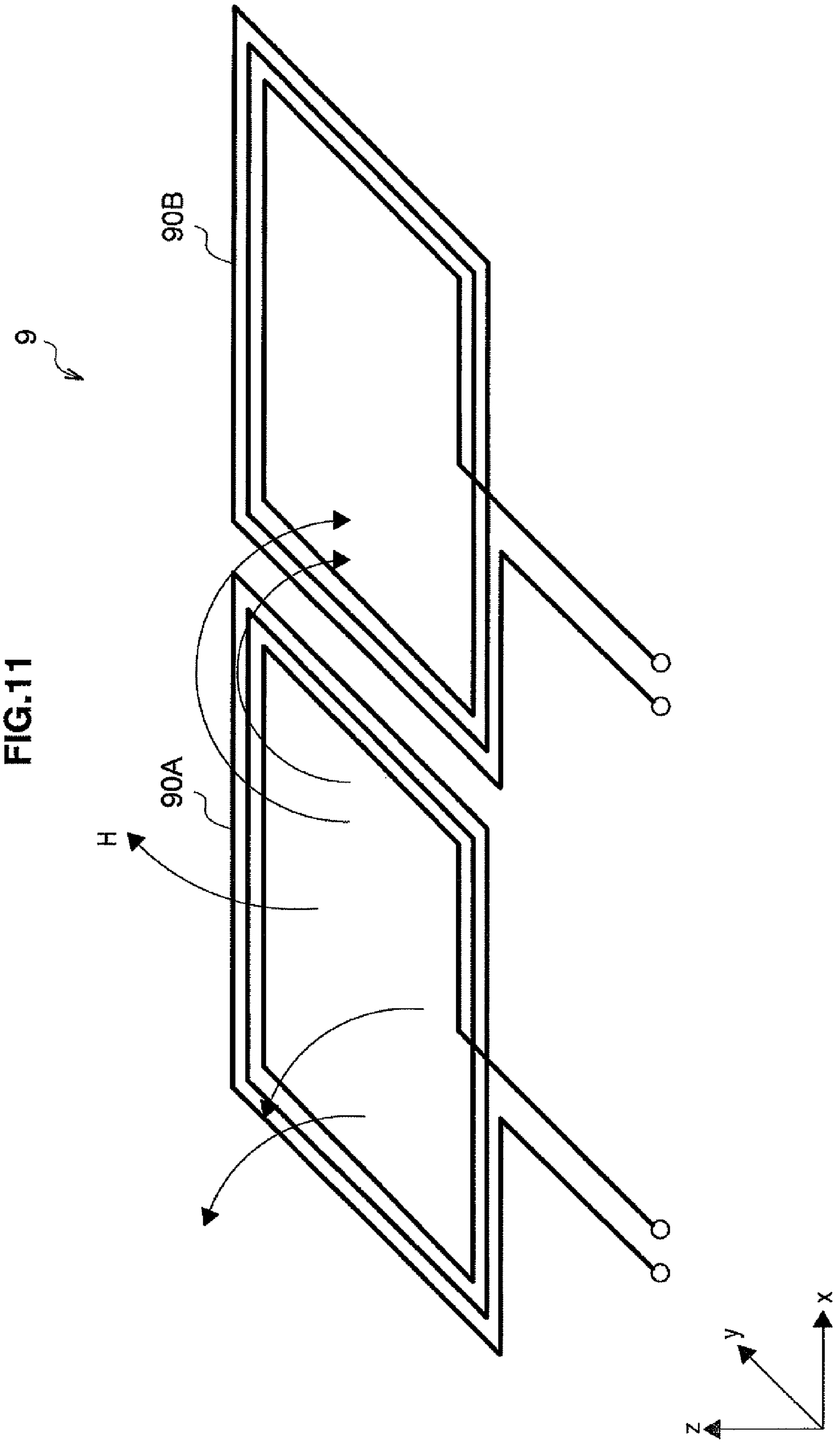
FIG. 11 is an explanatory diagram for explaining a magnetic field when two antenna coils are arranged closely in one communication apparatus.

FIG. 11 is an explanatory diagram for explaining an electric field when two antenna coils are arranged closely in one communication apparatus.

As shown in FIG. 11, when a signal voltage for transmission is applied to one of the two antenna coils 90A and 90B (for example, the antenna coil 90A), the antenna coil 90A generates a magnetic field H for coupling electric fields with which one-system contactless communication takes place. At this time, when both the antenna coils 90A and 90B are arranged closely in order to miniaturize a communication apparatus 9, the magnetic field H generated by the antenna coil 90A is sent to the outside of the antenna coil 90A and crosses the other antenna coil 90B. The antenna coil 90B generates an electromotive force toward a direction where the magnetic field H is hindered because of electromagnetic induction caused by the magnetic field H from the antenna coil 90A. As a result, the magnetic field H generated by the antenna coil 90A is weakened, and gain of the antenna coil 90A is reduced. On the other hand, as to a magnetic field generated by the antenna coil 90B, similarly gain is reduced by the antenna coil 90A. That is to say, the two antenna coils 90A and 90B are coupled in one communication apparatus 9, and thus the efficiency of the antennas is deteriorated.

The influence due to such electromagnetic induction is caused not only in one communication apparatus 9 but also between a communication apparatus on a transmission side and a communication apparatus on a reception side. That is to say, the magnetic field generated by the antenna coil of one system on the transmission side is received by the antenna coil of the other system on the reception side. The received magnetic field becomes a noise in the other system, and thus the S/N ratio is deteriorated (the issue of the S/N ratio).

Such an issue arises mainly due to, for example:

1) in two-system contactless communication, the magnetic field coupling is used; and 2) in two-system contactless communication, a parallel magnetic field is used.

The inventors of the present invention earnestly study the communication apparatus, and come to the above issue. The inventors of the present invention complete the communication apparatus according to embodiments of the present invention which solves the issue and improves its performance. Therefore, the communication apparatuses according to the embodiments of the present invention are described below.

First Embodiment

A constitution of the communication apparatus according to a first embodiment of the present invention is described with reference to FIGS. 1 and 2.

FIG. 1 is an explanatory diagram illustrating the constitution of the communication apparatus according to the first embodiment. FIG. 2 is a schematic cross-sectional view taken along line A-A of FIG. 1, and is an explanatory diagram illustrating a constitution that one communication apparatus makes contactless communication with the other communication apparatus according to the first embodiment. The communication apparatus 1 is on the transmission side, and the communication apparatus 2 is on the reception side. FIG. 1 illustrates the communication apparatus 1 on the transmission side, and the communication apparatus 1 on the transmission side is mainly described below, but the communication apparatus 2 on the reception side can be constituted similarly to the communication apparatus 1 on the transmission side as shown in FIG. 2. Needless to say, the communication apparatus 2 on the reception side can transmit data, and the communication apparatus 1 on the transmission side can receive data.

Figure 2:
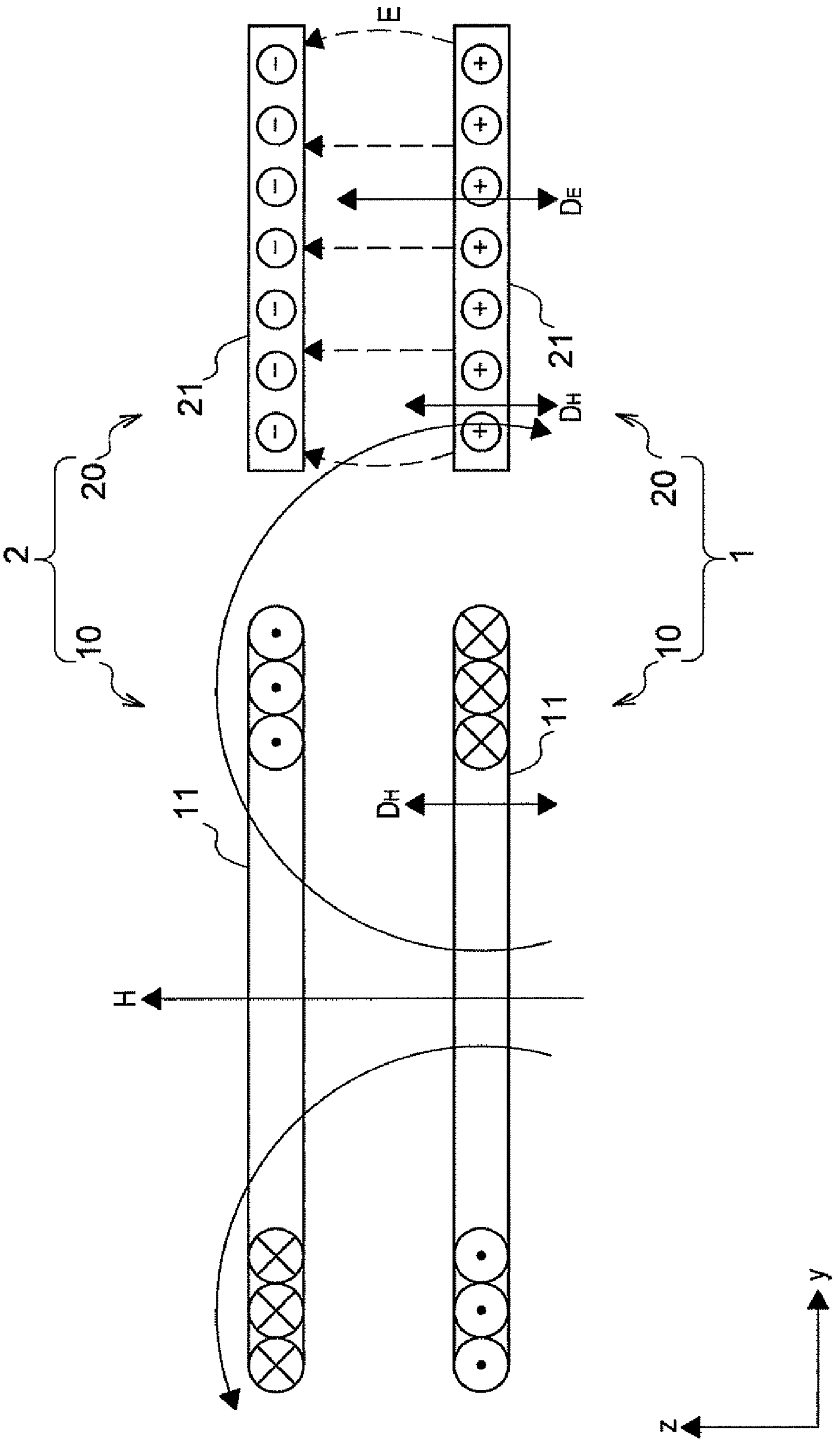
FIG. 2 is a schematic cross sectional-view taken along line A-A in FIG. 1 and is an explanatory diagram illustrating a constitution that one communication apparatus makes contactless communication with the other communication apparatus according to the first embodiment.

As shown in FIGS. 1 and 2, the communication apparatus 1 according to the first embodiment has a first communication section 10 and a second communication section 20. The first communication section 10 and the second communication section 20 are supported by a supporting substrate or the like (not shown), and compose a part of the communication apparatus 1. The communication apparatus 1 has two communication systems, and can transmit/receive plural pieces of information simultaneously. A case where the communication apparatus 1 is a communication apparatus which makes proximity type contactless communication is described below.

(First Communication Section)

First communication section 10 couples magnetic fields as first-system contactless communication. The first communication section 10 has an antenna coil 11, for example.

The antenna coil 11 is one example of the antenna which makes the first-system contactless communication by means of the magnetic field coupling, and is formed into a coil shape in x and y planes shown in FIG. 1. The antenna coil 11 is called also as "loop antenna". The antenna coil 11 is connected to a signal processing circuit (not shown) via a terminal 12, and a transmission signal (voltage or electric current) output from the signal processing circuit is applied to the antenna coil 11. An electric current is applied to the antenna coil 11 due to the transmission signal. The antenna coil 11 generates a magnetic field H due to the electric current. FIG. 1 illustrates a case where the antenna coil 11 is a three-wound coil, but the winding number of the antenna coil 11 is not limited to this.

A transmission signal output from the signal processing circuit is an AC voltage or current, for example, and the magnetic field H generated by the antenna coil 11 becomes an AC magnetic field. FIG. 1 illustrates a case where the magnetic field H is generated upward, but the magnetic field H has amplitude with which the magnetic field oscillates up or down according to an AC transmission signal. The x and y planes where the antenna coil 11 is formed are called also as "coil formed surface". The magnetic field H generated by the antenna coil 11 crosses approximately vertically to the coil formed surface not only inside the coil but also outside the coil. That is to say, the magnetic field H generated by the antenna coil 11 has an amplitude with which the magnetic field H oscillates to an approximately vertical direction (z-axial direction) on the coil formed surface. As shown in FIG. 2, the oscillation direction of the magnetic field H on the coil formed surface is called also as "magnetic field oscillation direction DH".

The first communication section 10 has the antenna coil 11 as one example of the antenna which makes the first-system contactless communication by means of the magnetic field coupling, but the present invention is not limited to this example. Any form of antenna which can make the proximity-type contactless communication by means of the magnetic field coupling may be used.

(Second Communication Section)

The second communication section 20 couples the magnetic fields as the second-system contactless communication. The second communication section 20 is called also as "electric field coupler" because it makes contactless communication by means of electric field coupling. The second communication section 20 has an electric field coupling electrode (hereinafter, simply "coupling electrode") 21, a connection signal line 22, a stub 23, an input/output signal line 24, and a substrate 25.

A connection relationship among the respective components is described.

The coupling electrode 21 is formed into a flat plate shape, and the connection signal line 22 is connected to a lower center of the flat plate. The connection signal line 22 electrically connects the coupling electrode 21 and the stub 23. The stub 23 is arranged between the input/output signal line 24 and the connection signal line 22. The input/output signal line 24 is connected to a signal processing circuit (not shown) via a terminal 26, and a second-system transmission signal (voltage or electric current) output from the signal processing circuit is applied to the input/output signal line 24. That is to say, the second-system transmission signal output from the signal processing circuit is input into the input/output signal line 24 via the terminal 26, and is transmitted by the input/output signal line 24 so as to be input into the stub 23. The transmission signal input into the stub 23 is transmitted to the coupling electrode 21 via the connection signal line 22, and generates an electric field E on the coupling electrode 21. In the case of the communication apparatus 2 on the reception side, a reception signal follows the reverse pathway so as to be transmitted to the signal processing circuit. On the other hand, the substrate 25 is formed by an insulator or the like, the stub 23 is formed thereon, and the substrate 25 supports the respective components in the second communication section 20. The second communication section 20 may include an additional supporting member (not shown) for supporting the coupling electrode 21 and the like, but the supporting member is preferably formed by an insulator, for example.

Figure 3A:
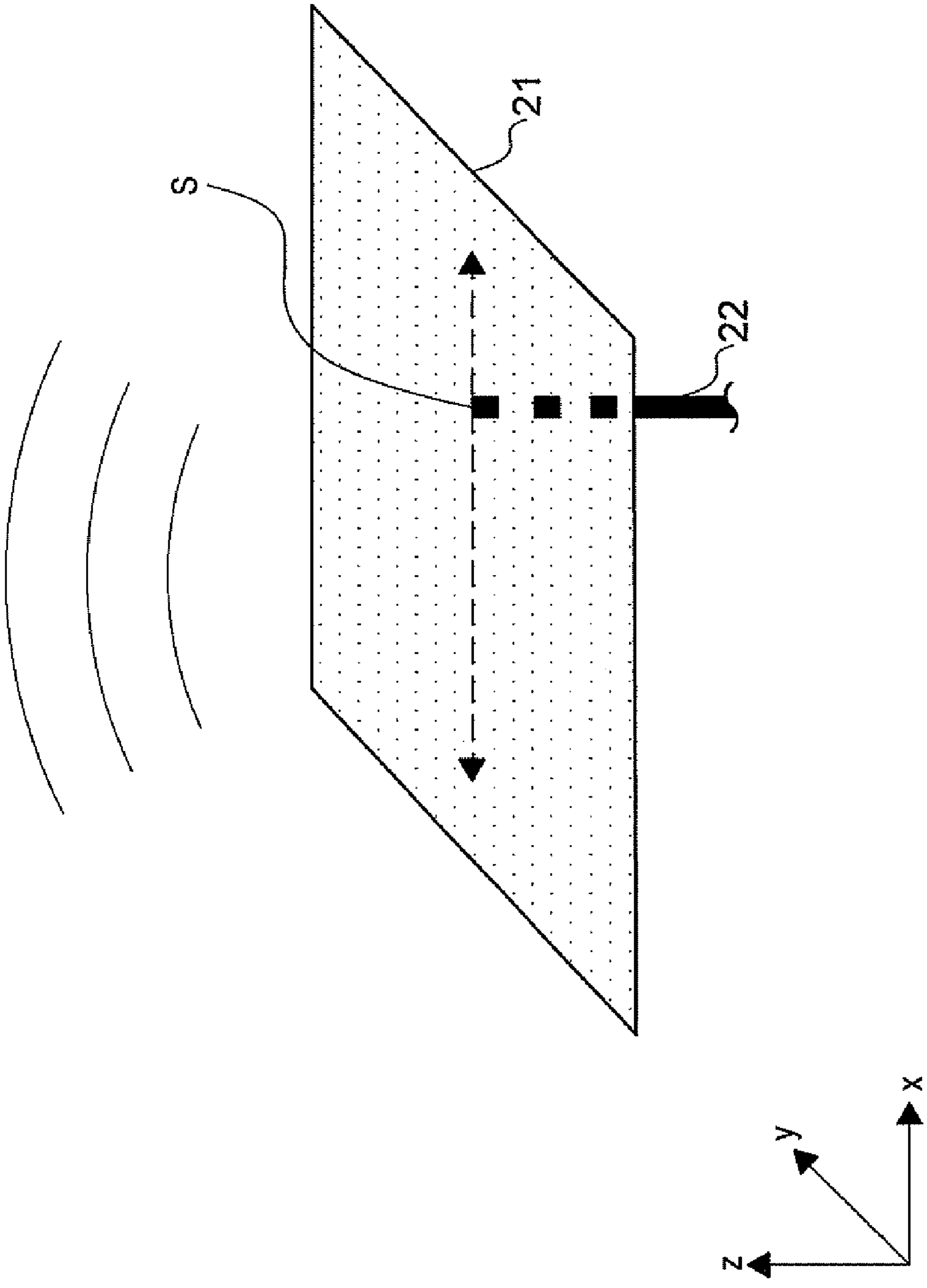
FIG. 3A is an explanatory diagrams for explaining an electric current applied to a coupling electrode.

As shown in FIG. 3A, when the connection signal line 22 is arranged on a position S which is offset from an approximately center position O of the coupling electrode 21 by a predetermined distance, an uneven electric current flows to an in-plane direction of the coupling electrode 21, and an operation is performed like a microstrip antenna. That is to say, the coupling electrode 21 discharges an unnecessary radio wave, such as a lateral radio wave which advances to a desirably-propagating direction (z-axial direction). On the other hand, like the communication apparatuses 1 and 2 according to the first embodiment shown in FIG. 3B, the connection signal line 22 is arranged on the approximately center position O of the coupling electrode 21, and an even electric current flows to the in-plane direction of the coupling electrode 21.

The stub 23 is formed as a conductor pattern on the substrate 25, and the other end is connected to a ground. More concretely, a conductive ground layer (not shown) is formed on a surface opposite to the surface of the substrate 25 where the stub 23 is formed. A terminal section G (end portion in an x-axial negative direction of FIG. 1) of the stub 23 opposite to an end portion (end portion in an x-axial positive direction of FIG. 1) connected to the input/output signal line 24 is connected to the ground layer via a through hole (not shown) formed on the substrate 25 so as to short out.

A length L1 in a signal transmission direction of the stub 23 is preferably about ½ of a wavelength in a frequency band of a transmission/reception signal. In this case, since the end portion of the stub 23 in the x-axial negative direction shorts out, a standing wave might be generated on the stub 23 due to a transmission/reception signal. That is to say, the voltage at the end portion (forward end) of the stub 23 in the x-axial negative direction in FIG. 1 becomes approximately 0 V (node), and the voltage at the center obtains a maximal value (antinode). The connection signal line 22 is connected to a position at the center of the stub 23 (position at about ¼ of the wavelength from the forward end). Therefore, the connection signal line 22 can transmit a transmission signal whose amplitude might obtain a maximal value to the coupling electrode 21, and the coupling electrode 21 can couple electric fields of high propagating efficiency.

The above describes the case of using a distributed constant circuit as the constitution for matching impedance, but a lumped constant circuit can be used.

The electric field E generated by the second communication section 20 is described.

Figure 4:
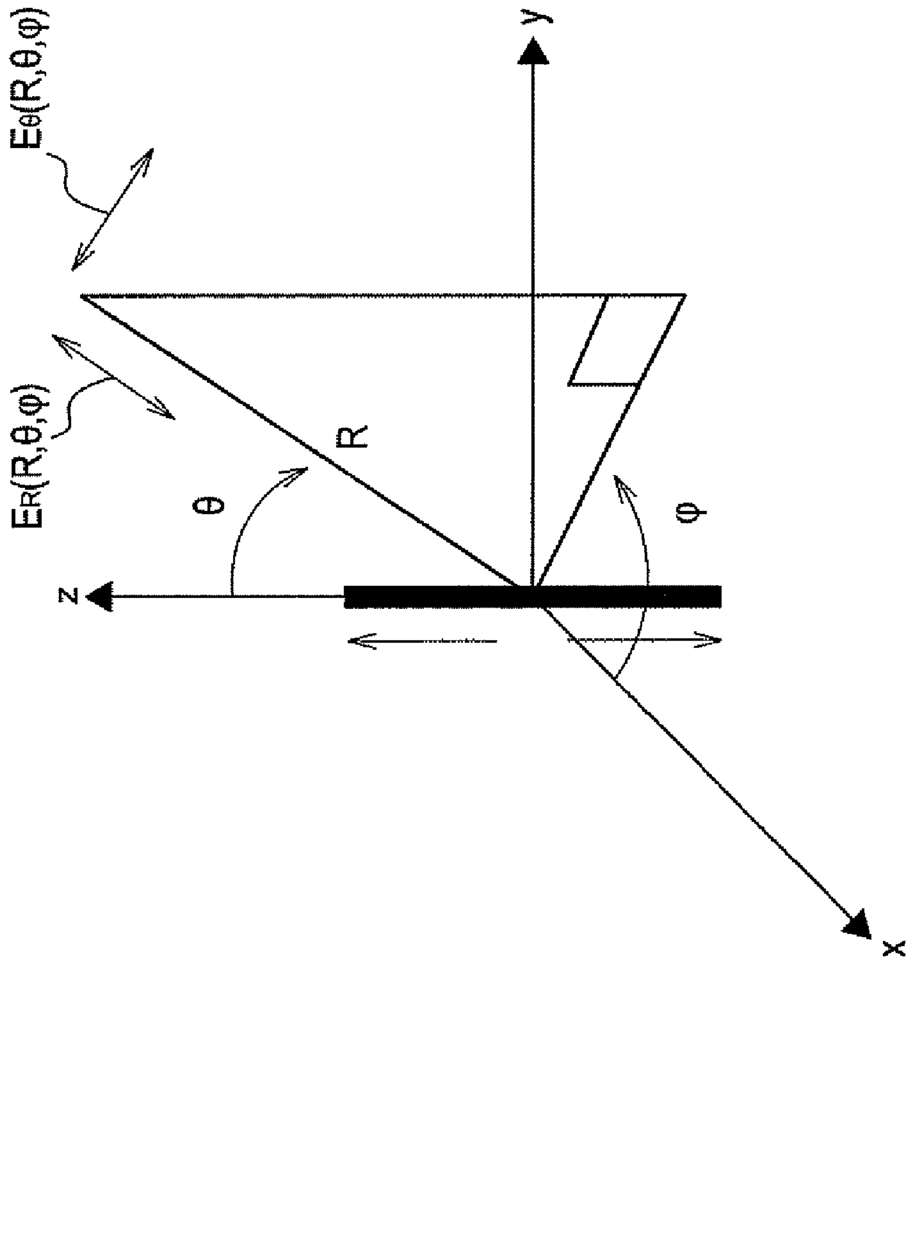
FIG. 4 is an explanatory diagram for explaining an electric field to be generated by a second communication section according to the first embodiment.

In general, as an electric field discharged from an antenna generally includes an "emission electric field" which attenuates in inverse proportion to the distance from the antenna, an "induction electric field" which attenuates in inverse proportion to a square of the distance from the antenna, and a "quasi-electrostatic field" which attenuates in inverse proportion to a cube of the distance from the antenna. On the other hand, any electric current distribution is considered to be a group of distribution of an electric current flowing in a microscopic dipole, and an electric field which is induced by the microscopic dipole has the similar property (for example, see "Antenna/radio wave propagation" written by Yasuto Mushiake (pages 16 to 18, Corona Publishing Co., Ltd.). As shown in FIG. 4, the second communication section 20 is approximated as the microscopic dipole 30 which is extended to a desirable communication direction, namely, the z-axial direction (a direction where the connection signal line 22 is formed). As a result, the electric field E discharged from the microscopic dipole 30 is expressed by the following (Mathematical Formula 1) and (Mathematical Formula 2).

$$E_\theta = \frac{pe^{-jkR}}{4\pi\varepsilon}\left(\frac{1}{R^3} + \frac{jk}{R^2} - \frac{k^2}{R}\right)\sin\theta \quad \text{(Mathematical Formula 1)}$$

$$E_R = \frac{pe^{-jkR}}{2\pi\varepsilon}\left(\frac{1}{R^3} + \frac{jk}{R^2}\right)\cos\theta \quad \text{(Mathematical Formula 2)}$$

R represents a distance from the microscopic dipole 30, θ represents an angle from an axial direction of the microscopic dipole 30, ϕ represents a rotation angle about the axis of the microscopic dipole 30, j represents current density flowing in the microscopic dipole 30, ∈ represents a dielectric constant, and p and k represent constants.

As shown in (Mathematical Formula 1) and (Mathematical Formula 2), roughly classified two kinds of electric fields Eθ and ER are discharged from the microscopic dipole 30. The electric field Eθ is an electric field component (lateral wave component) which oscillates to a direction vertical to the propagation direction, and the electric field ER is an electric field component (longitudinal wave component) which oscillates to a direction parallel with the propagation direction. The electric field Eθ includes the emission electric field, the induction electric field and the electrostatic field, and the electric field ER does not include the emission electric field but includes the induction electric field and the electrostatic field.

On the other hand, in the communication apparatus 1 according to the first embodiment, an electric field for establishing a relationship θ=0° is mainly used so that the x-axial direction is made to be the information propagation direction. In this case, according to the (Mathematical Formula 1), Eθ=0, whereas according to the (Mathematical Formula 2), ER obtains a maximal value.

Therefore, since the second communication section 20 makes contactless communication without using an emission electric field which propagates far, it is particularly suitable for proximity-type contactless communication. The oscillation direction of the electric field ER is also called as "electric field oscillation direction DE) as shown in FIG. 2.

(Positional Relationship Between the First Communication Section and the Second Communication Section)

As shown in FIGS. 1 and 2, the first communication section 10 and the second communication section 20 are arranged on the same plane. At this time, the second communication section 20 is arranged in the magnetic field H generated by the first communication section 10. More concretely, the coupling electrode 21 of the second communication section 20 is arranged near the first communication section 10 outside the coil on the coil formed surface of the antenna coil 11 of the first communication section 10. As a result, at least a part of the magnetic field H to be used for coupling electric fields in the first communication section 10 crosses the coupling electrode 21 of the second communication section 20. At this time, a magnetic field oscillation direction DH of the magnetic field H crosses vertically to the coupling electrode 21. Therefore, the magnetic field oscillation direction DH on the surface of the coupling electrode 21 becomes parallel with an electric field oscillation direction DE of the electric field E to be used for coupling electric fields by the coupling electrode 21 of the second communication section 20. In other words, the magnetic field oscillation direction DH and the electric field oscillation direction DE are parallel with each other on the coil formed surface (see FIG. 2). The electric field and the magnetic field whose oscillation directions are parallel with each other hardly influence each other, and the communication section 1 reduces an interference (the issue of the antenna efficiency) due to the coupling between the first communication section 10 as the first communication system and the second communication section 20 as the second communication system, so that two-system contactless communication can be made.

More concretely, the reason for reducing the interference due to the coupling between the first communication section 10 and the second communication section 20 is described below. A change in an electric field is generally accompanied by a change in a magnetic field, and the change in a magnetic field is accompanied by the change in an electric field. The magnetic field oscillation direction and the electric field oscillation direction are vertical to each other. The magnetic fields or the electric fields whose oscillation directions have matched components interfere with each other. Therefore, interference is caused also between the electric field and the magnetic field whose oscillation directions are vertical to each other. Such interference influences the electric field coupling and the magnetic field coupling. On the other hand, the magnetic field or the electric field whose oscillation directions are vertical to each other hardly interfere with each other, and similarly interference is hardly caused between the magnetic field and the electric field whose oscillation directions are parallel with each other.

On the contrary, in the communication apparatus 1 according to the first embodiment, the magnetic field oscillation direction DH of the magnetic field H becomes parallel with the electric field oscillation direction DE of the electric field E generated by the coupling electrode 21. Therefore, the communication section 1 can prevent a transmission signal from the antenna coil 11 from being coupled with the coupling electrode 21. The communication apparatus 1 can prevent a transmission signal from the coupling electrode 21 from being coupled with the antenna coil 11. As to this point, a case where the second communication section 20 is approximated to the microscopic dipole 30 as shown in FIG. 4 is described below.

in this case, a direction from the second communication section 20 approximated to the microscopic dipole 30 towards the first communication section 10 is such that θ=90. Therefore, the electric field Eθ generated from the second communication section 20 obtains a maximal value, and the electric field ER becomes 0 from the above (equation 1) and (equation 2). Therefore, a lateral wave whose oscillation direction is the z-axial direction propagates through the antenna coil 11. However, the oscillation direction of the lateral wave becomes parallel with the magnetic field oscillation direction DH of the magnetic field H on the coil formed surface of the antenna coil 11. Therefore, the communication apparatus 1 can prevent also a transmission signal from the coupling electrode 21 from being coupled with the antenna coil 11.

In general, the oscillation direction of an electric field is approximately equal to a direction of an electric current flowing in an antenna for generating an electric field (oscillation direction of electrons), and the oscillation direction of a magnetic field is perpendicular to a direction of an electric current flowing in an antenna for generating a magnetic field. After this point is taken into consideration, an influence of a transmission signal from the other communication section on each communication section is described as follows.

The oscillation direction of electrons near the coupling electrode 21 of the second communication section 20 is the electric field oscillation direction DE. The magnetic field oscillation direction DH of the magnetic field H generated by the antenna coil 11 of the first communication section 10 on the position of the second communication section 20 becomes parallel with the electron oscillation direction (electric field oscillation direction DE). Therefore, the electric field oscillation direction due to the magnetic field H becomes vertical to the electron oscillation direction on the coupling electrode 21. The communication apparatus 1 can prevent the electric field due to the magnetic field H from reducing generation efficiency of the electric field E on the coupling electrode 21. On the other hand, the oscillation direction of the electric field generated to the direction of the antenna coil 11 by the second communication section 20 becomes the z-axial direction. Therefore, the direction of the electric current flowing in the antenna coil 11 (direction in the xy plane) becomes vertical to the electric field oscillation direction. Therefore, the communication apparatus 1 can prevent the electric field from reducing generation efficiency of the magnetic field H on the antenna coil 11. The magnetic field which might be generated to the direction of the antenna coil 11 by the second communication section 20 does not go through the antenna coil 11. Therefore, the influence of this magnetic field can be ignored.

With the communication apparatus 1 according to the first embodiment, it is found that the issue of the antenna efficiency can be improved. As to "parallel", "vertical", and "same plane" in the above description, "parallel", states of "vertical", and "same plane" are not strictly necessary, and thus the meaning of these words are carried to a level that the electric field and the magnetic field do not influence each other (the same is applied to the following).

In the communication apparatus 1 according to the first embodiment, the issue of the S/N ratio is also improved due to the same reason.

(Example of Effect of the First Embodiment)

The communication apparatus 1 according to the first embodiment was described above.

The communication apparatus 1 has the first communication system which makes the contactless communication by means of magnetic field coupling and the second communication system which makes contactless communication by means of electric field coupling. In the apparatus 1, the oscillation direction of the magnetic field to be used for the magnetic field coupling is parallel with the oscillation direction of the electric field to be used for the electric field coupling.

In such a constitution, the communication apparatus 1 has the first communication section 10 which makes contactless communication as the first communication system and the second communication section 20 which makes contactless communication as the second communication system, and they can be operated simultaneously. The communication apparatus 1 can reduce interference between the communication sections in one communication apparatus due to the coupling (the issue of the antenna efficiency). The communication apparatus 1 can prevent the communication system as the first communication section on the transmission side from being coupled with the communication section as the other communication system on the reception side (the issue of the S/N ratio).

Therefore, in the communication apparatus 1, the first communication section 10 and the second communication section 20 can be arranged closely, and the apparatus can be miniaturized. In the communication apparatus 1, a frequency range of a signal to be used for each communication system is changed, and the signals are filtered by the signal processing section (not shown) so that noises and interference can be repressed.

Figure 5:
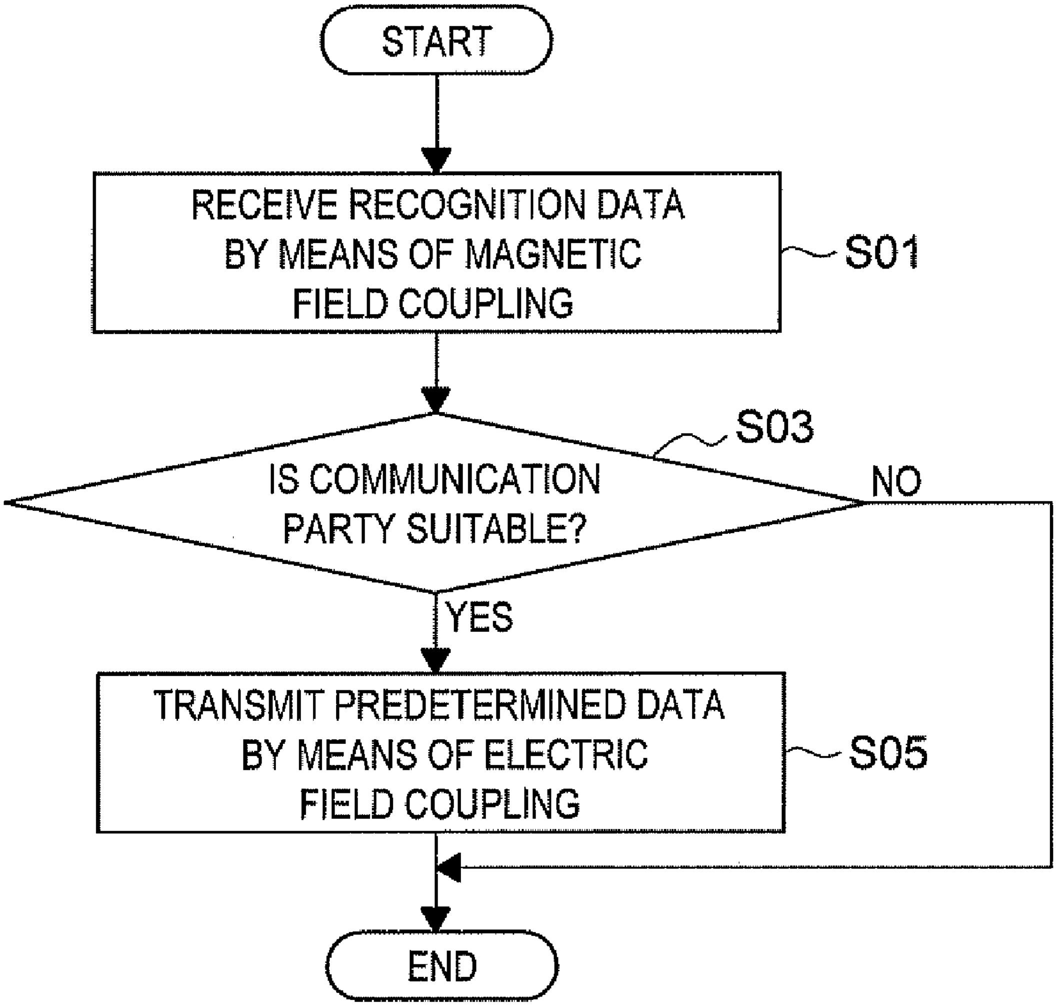
FIG. 5 is an explanatory diagram explaining an example of an operation in the communication apparatus according to the first embodiment.

When the communication apparatus 1 is allowed to be close to a communication apparatus 2 as a communication partner only at one time, two data can be transmitted/received at one time (this does not mean temporally simultaneous in some cases). Since the contactless communication utilizing the electric field coupling by means of the second communication section 20 efficiently takes place at high frequencies, data can be transmitted at a high speed. Therefore, the communication section 1 can heighten security of the communication and can transmit data at a high speed as shown in FIG. 5. FIG. 5 is an explanatory diagram for explaining an example of the operation of the communication apparatus 1 according to the first embodiment.

As shown in FIG. 5, the first communication section 10 receives authentication data for authenticating the communication apparatus 2 from the communication apparatus 2 as a communication partner via contactless communication utilizing the magnetic field coupling (S01).

The signal processing section (not shown) connected to the first communication section 10 and the second communication section 20 acquires authentication data and determines whether the communication apparatus 2 is a suitable communication partner (S02).

When the communication apparatus 2 is a suitable communication partner, the signal processing section outputs a transmission signal generated from data to be transmitted to the second communication section 20. As a result, the second communication section 20 transmits the data to be transmitted to the communication apparatus 2 via electric field coupling (S03).

At this time, the transmission signal to be applied to the second communication section 20, a high-frequency signal can be used. Therefore, data can be transmitted by the second communication section 20 at a high speed. That is to say, when the communication apparatus 1 is allowed to be close to the communication partner only one time, data communication can be made therebetween at a high speed. For this reason, operability of the communication apparatus 1 can be improved. On the other hand, since the communication apparatus 1 can be formed into a thin shape, it is suitable for packaging of mobile phones and cards, for example. Therefore, when the communication apparatus 1 is applied to a device having a credit function, the device is held over the communication partner only one time so that authentication and accounting can be carried out simultaneously at a high speed.

On the other hand, in the proximity-type contactless communication of contactless IC cards and FRID, a communicable distance is shorter than the other communication systems. Therefore, in the contactless communication, the position of the transmission antenna is typically detected, and the positions of both the antennas should be aligned so that the reception antenna is overlapped with the detected position. Therefore, in typical communication apparatus which makes contactless communication and into which a plurality of communication systems is incorporated, when contactless communication of proximity type or the like is made simultaneously, the positions of transmission-side and reception-side antennas should be moved so that the antennas are overlapped with the antenna positions of the respective communication systems. For this reason, usability of this communication apparatus is not satisfactory. Therefore, the communication apparatus according to a second embodiment of the present invention whose usability can be improved is described below with reference to FIGS. 6 and 7.

Second Embodiment

Figure 6:
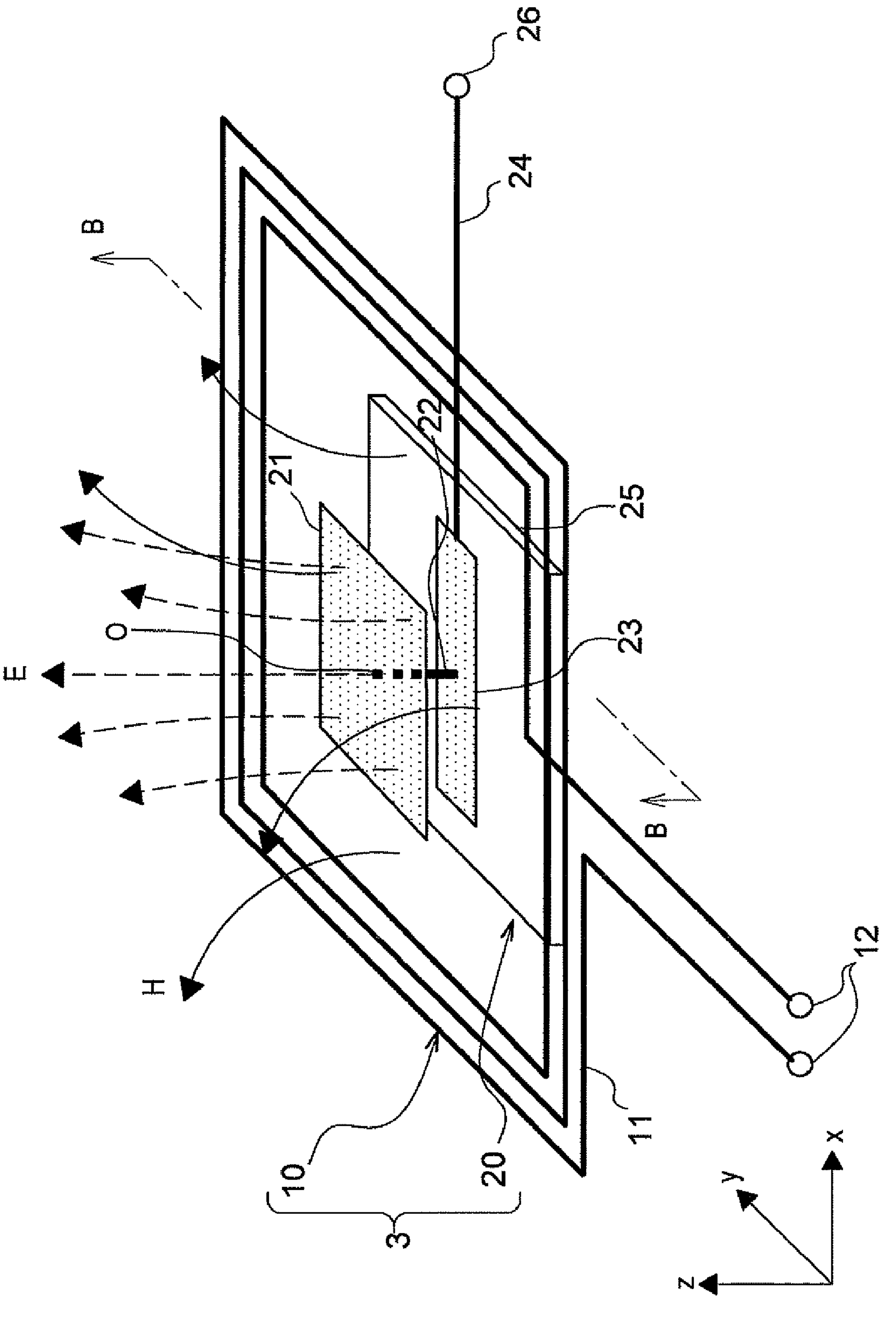
FIG. 6 is an explanatory diagram illustrating a constitution of the communication apparatus according to a second embodiment of the present invention.
Figure 7:
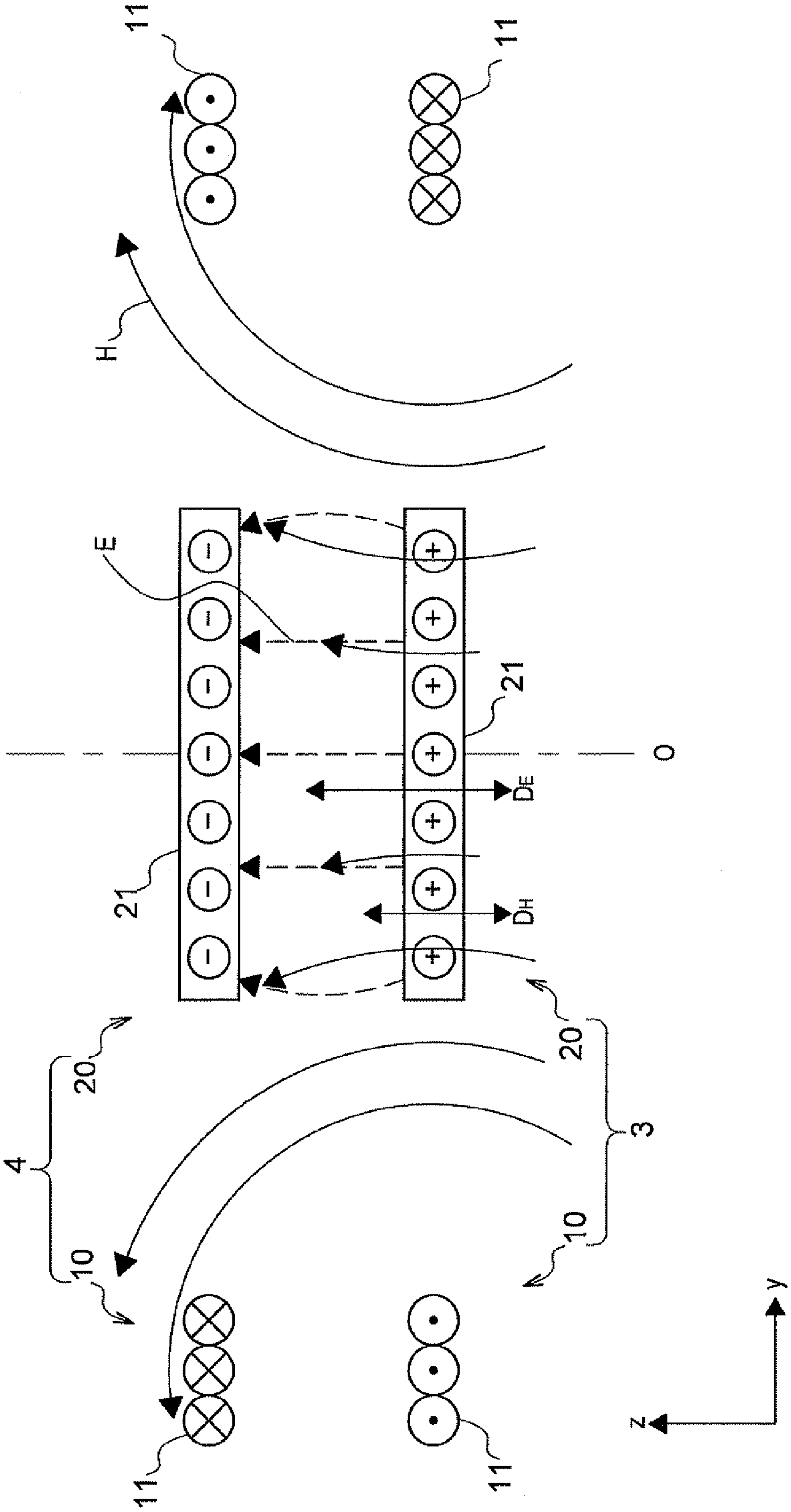
FIG. 7 is a schematic cross-sectional view taken along line B-B of FIG. 6 and is an explanatory diagram illustrating a constitution that one communication apparatus makes contactless communication with the other communication apparatus according to the second embodiment.

FIG. 6 is an explanatory diagram illustrating a constitution of the communication apparatus according to the second embodiment of the present invention. FIG. 7 is a schematic cross-sectional view taken along line B-B of FIG. 6 and is an explanatory diagram illustrating a constitution where contactless communication is made between one communication apparatus and the other communication apparatus according to the second embodiment. In the second embodiment, a communication apparatus 3 is on the transmission side, and a communication apparatus 4 is on the reception side. FIG. 6 illustrates the communication apparatus 3 on the transmission side, and it is described mainly, but the communication apparatus 4 on the reception side and the communication apparatus 3 on the transmission side can be constituted similarly as shown in FIG. 7. The communication apparatus 4 on the reception side can transmit data, and the communication apparatus 3 on the transmission side can receive data.

The communication apparatus 3 according to the second embodiment has the first communication section 10 and the second communication section 20 similarly to the communication apparatus 1 according to the first embodiment. In the communication apparatus 3 according to the second embodiment, a positional relationship between the first communication section 10 and the second communication section 20 is different from that in the first embodiment, but the other parts of the constitution are similar. Therefore, the positional relationship between the first communication section 10 and the second communication section 20 is mainly described below, and the description about the similar parts is omitted.

As shown in FIGS. 6 and 7, also in the communication apparatus 3 according to the second embodiment, the first communication section 10 and the second communication section 20 are arranged on the same plane. At this time, the second communication section 20 is arranged in the magnetic field H generated by the first communication section 10. The coupling electrode 21 of the second communication section 20 is arranged on approximately center of the coil on the coil formed surface of the antenna coil 11 of the first communication section 10. That is to say, as shown in FIG. 7, the center position O of the coupling electrode 21 of the second communication section 20 approximately matches with the center of the antenna coil 11 of the first communication section 10. As a result, the magnetic field H to be used for the magnetic field coupling of the first communication section 10 crosses the coupling electrode 21 of the second communication section 20 similarly to the first embodiment. At this time, the magnetic field oscillation direction DH of the magnetic field H crosses the coupling electrode 21 vertically. Therefore, the magnetic field oscillation direction DH on the surface of the coupling electrode 21 becomes parallel with the electric field oscillation direction DE of the electric field E to be used for the electric field coupling by the coupling electrode 21 of the second communication section 20. In other words, the magnetic field oscillation direction DH and the electric field oscillation direction DE are parallel with each other on the coil formed surface. It is difficult that the electric field and the magnetic field whose oscillation directions are parallel with each other influence each other. The communication apparatus 3 according to the second embodiment reduces the interference due to the coupling between the first communication section 10 as the first communication system and the second communication section 20 as the second communication system so as to be capable of making the two-system contactless communication similarly to the communication apparatus 1 according to the first embodiment.

In the communication apparatus 3 according to the second embodiment, the center of the antenna coil 11 as the communication surface of the first communication section 10 matches with the center O of the coupling electrode 21 as the communication surface of the second communication section 20. Therefore, even when the two communication systems are operated simultaneously, the communication apparatus 3 can facilitate locating of the respective communication sections, and the operability can be improved. In the communication apparatus 3 according to the second embodiment, since both the antenna coil 11 and the coupling electrode 21 can be arranged in a space which is the same as the space where the antenna coil 11 alone occupies, the communication apparatus 3 can be miniaturized.

The strength of the magnetic field H generated from the antenna coil 11 generally becomes weaker towards the center as shown in FIG. 7. Therefore, in the communication apparatus 3 according to the second embodiment, since the coupling electrode 21 is arranged on the center of the antenna coil 11 where the magnetic field H reduced, the interference (namely, coupling) between the coupling electrode 21 and the antenna coil 11 can be further repressed.

It goes without saying that also the communication apparatus 3 according to the second embodiment can solve the issue of the antenna efficiency and the issue of the S/N ratio by means of the function similar to the communication apparatus 1 according to the first embodiment, namely, produces the effect of the communication apparatus 1 according to the first embodiment.

<About Eddy Current Generated on the Coupling Electrode>

Figure 8:
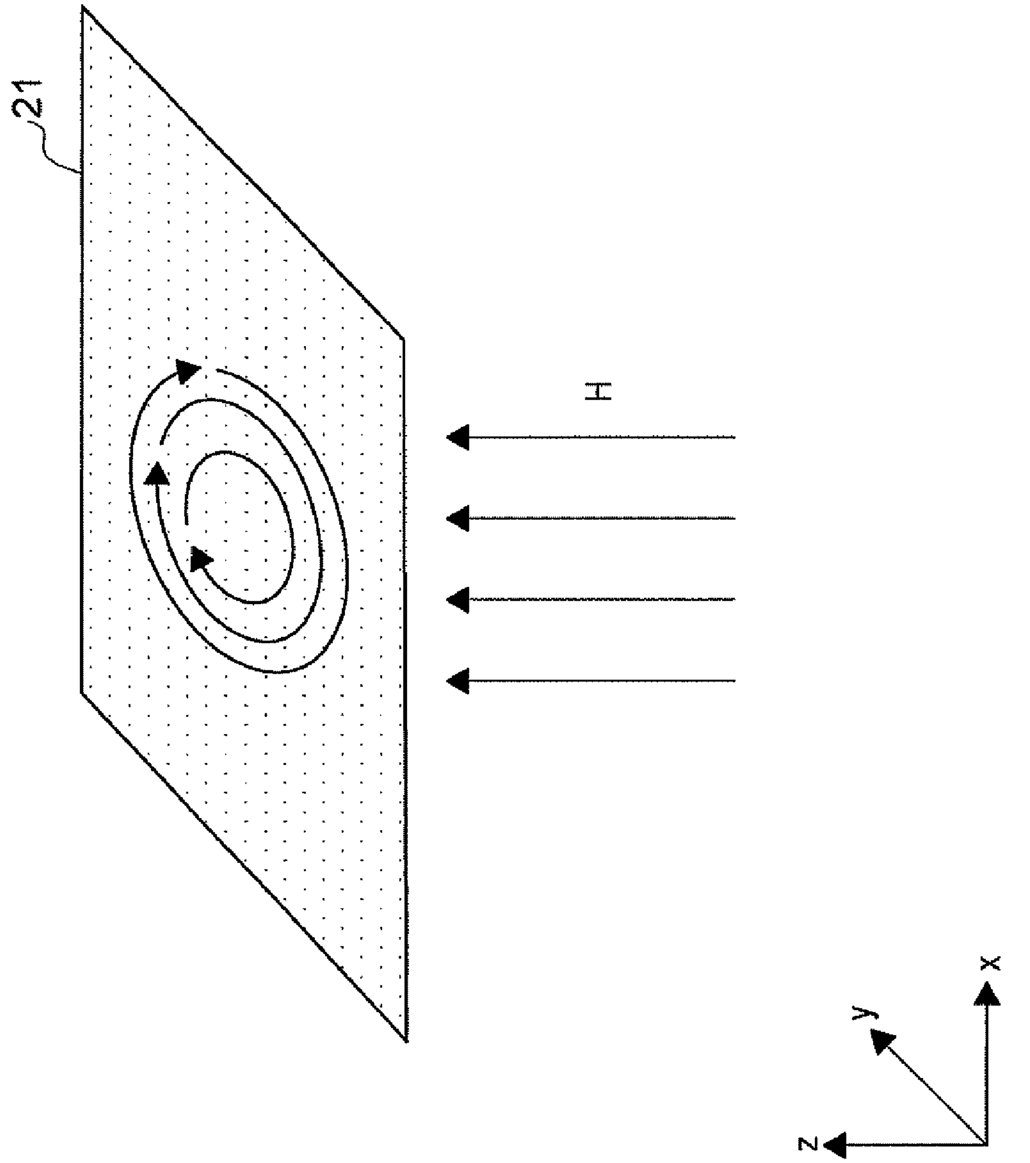
FIG. 8 is an explanatory diagram for explaining an eddy current generated on a coupling electrode.

The eddy current generated on the coupling electrode 21 in the communication apparatuses 1 and 3 according to the first and second embodiments is described with reference to FIG. 8. FIG. 8 is an explanatory diagram for explaining the eddy current generated on the coupling electrode.

In the first and second embodiments, the magnetic field H generated by the antenna coil 11 crosses the coupling electrode 21 vertically. Therefore, a spiral-shaped electric current (eddy current) is generated on the coupling electrode 21 by the effect of electromagnetic induction due to the crossed magnetic field H. The eddy current cancels the magnetic field H generated by the antenna coil 11, and reduces a coupling efficiency of the first communication system by means of the antenna coil 11.

In the first and second embodiments, the magnetic field which crosses the coupling electrode 21 is a small part of the magnetic field H generated by the antenna coil 11. The eddy current is vertical to the magnetic field oscillation direction DE (z-axial direction) of the electric field E oscillated by the coupling electrode 21. Therefore, an influence of the eddy current over the coupling efficiency by means of the antenna coil 11 and the generation efficiency of the electric field E by means of the coupling electrode 21 is small. Therefore, the communication apparatuses 1 and 3 according to the first and second embodiments can sufficiently produce the effects.

When the influence of the eddy current is further reduced, however, the coupling efficiency of the first communication system by means of the antenna coil 11 can be further improved. Therefore, the communication apparatus according to a third embodiment of the present invention which can further reduce the influence of the eddy current is described below with reference to FIG. 9.

Third Embodiment

Figure 9:
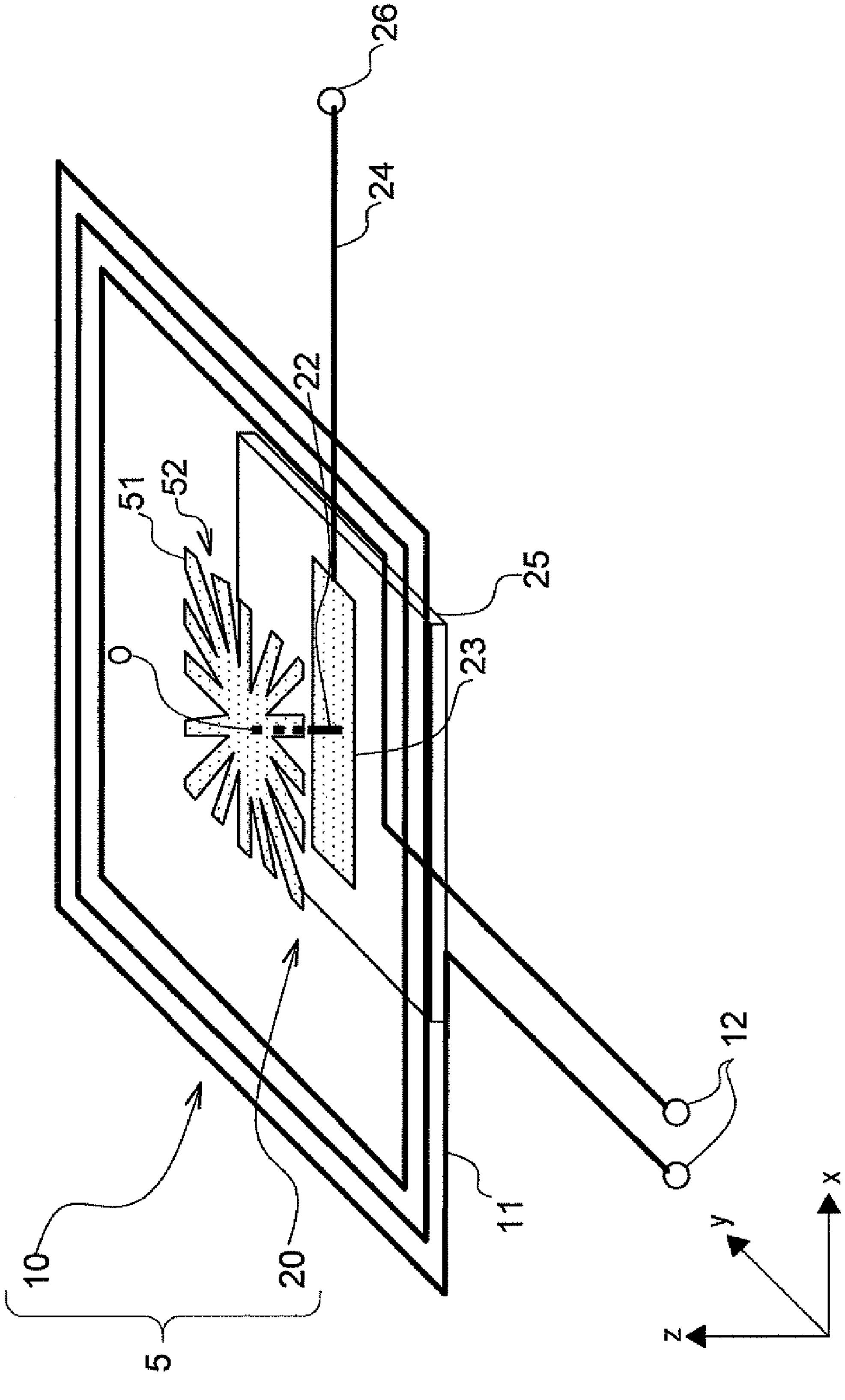
FIG. 9 is an explanatory diagram illustrating a constitution of the communication apparatus according to a third embodiment.

FIG. 9 is an explanatory diagram illustrating a constitution of the communication apparatus according to the third embodiment. The communication apparatus 5 according to the third embodiment has a coupling electrode 51 instead of the coupling electrode 21 of the communication apparatus 3 according to the second embodiment. Since the other parts of the constitution of the communication apparatus 5 according to the third embodiment are similar to those of the communication apparatus 3 according to the second embodiment, the detailed description thereof is omitted.

The coupling electrode 51 of the communication apparatus 5 according to the third embodiment is arranged similarly to the coupling electrode 21 in the first and second embodiments. Therefore, the coupling electrode 51 can couple electric fields efficiently via the electric field E.

The coupling electrode 51 of the communication apparatus 5 according to the third embodiment has a plurality of slits 52 which is formed into a radial pattern about the center position O from an outer periphery of the coupling electrode 51 differently from the coupling electrode 21 in the first and second embodiments. Since the slits 52 can cut an electric current path of the eddy current, the eddy current can be made to hardly flow. Therefore, the communication apparatus 5 according to the third embodiment can further improve the coupling efficiency of the antenna coil 11.

Figure 3B:
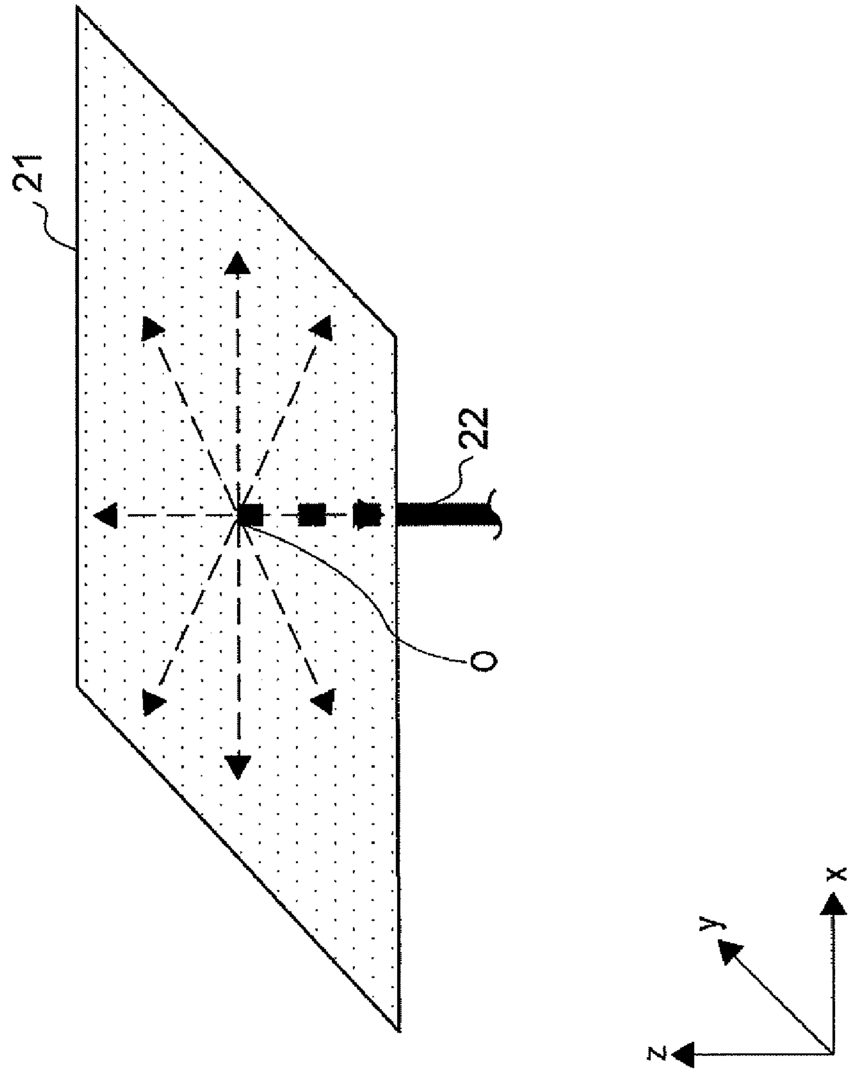
FIG. 3B is an explanatory diagram for explaining an electric current flowing to the coupling electrode according to the first embodiment.

The electric current flowing in the coupling electrode 51 is supplied from the connection signal line 22 connected to the center position O, and is transmitted radially from the center position O (see FIG. 3B). Therefore, when the slits 52 are formed radially about the center position O, the coupling efficiency of the antenna coil 11 can be further improved without deteriorating the electric field coupling efficiency by means of the coupling electrode 51. The slits 52 are desirably formed so as to be thin to a level such that a percentage of the slits 52 is not large with respect to an area of the coupling electrode 51.

It goes without saying that also the communication apparatus 5 according to the third embodiment can solve the issue of the antenna efficiency and the issue of the S/N ratio by means of the function similar to the communication apparatus 3 according to the second embodiment, and can improve the operability while miniaturizing communication device 5, namely, produces the effect which is the same as the communication apparatus 3 according to the second embodiment.

The constitutions of the communication apparatuses 1, 3 and 5 according to the first to third embodiments of the present invention are described above. A concrete constitution in the case where the communication apparatuses 1, 3 and 5 are packaged into another devices is described below with reference to FIG. 10. An example in the case where the communication apparatus 3 according to the second embodiment is packaged into another device is described below. However, the cases where the communication apparatuses 1 and 5 according to the other embodiments are packaged into another device can be constituted similarly.

Fourth Embodiment

Figure 10:
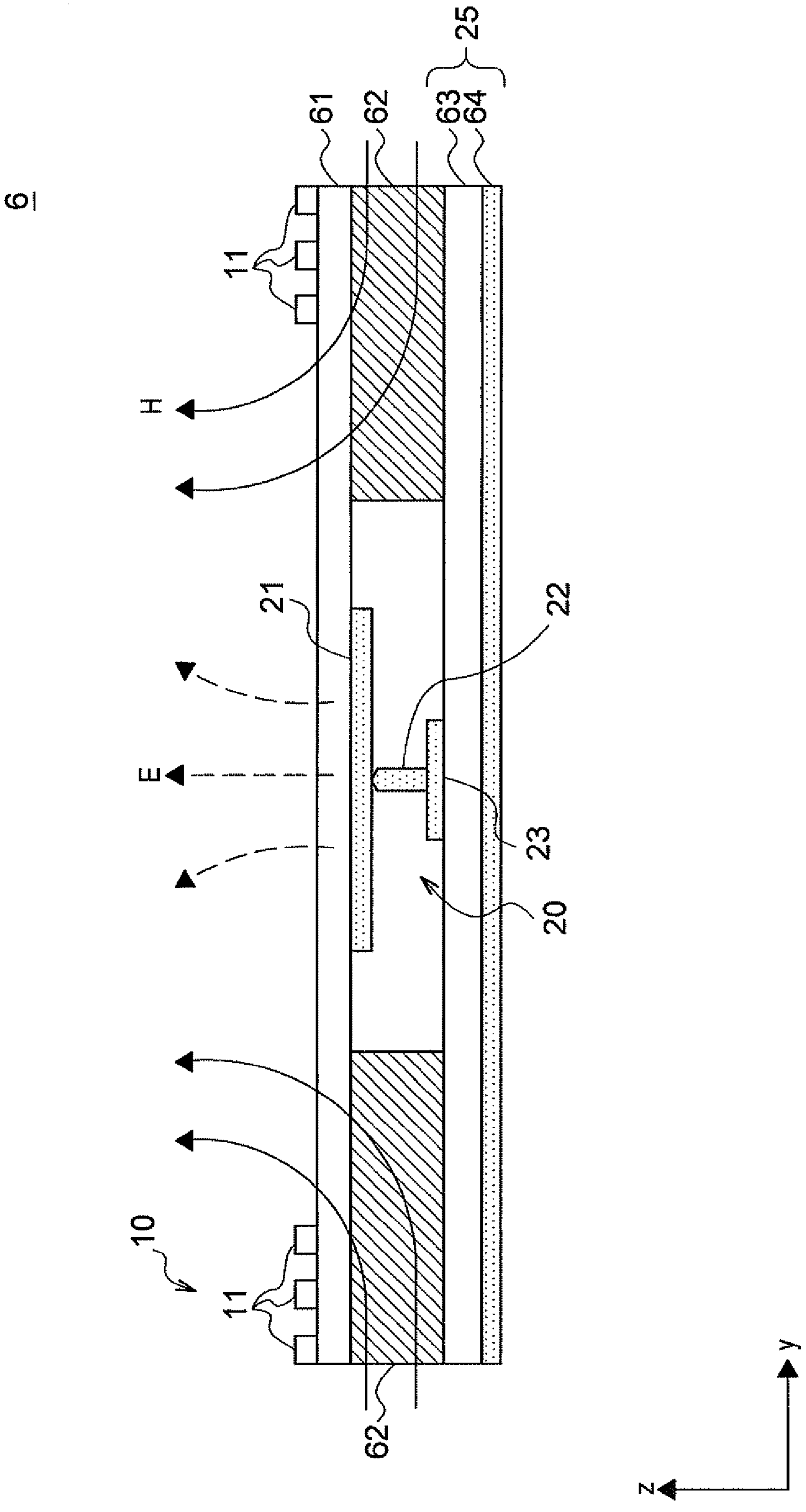
FIG. 10 is an explanatory diagram illustrating a constitution of the communication apparatus according to a fourth embodiment of the present invention.

FIG. 10 is n explanatory diagram illustrating a constitution of the communication apparatus according to a fourth embodiment of the present invention. FIG. 10 is a cross-sectional view of a communication apparatus 6 on the transmission side, and the communication apparatus 6 on the transmission side is mainly described below. However, a communication apparatus on the reception side can be constituted similarly to the communication apparatus 6 on the transmission side. The communication apparatus on the reception side can transmit data and the communication apparatus 6 on the transmission side can receive data.

The communication apparatus 6 according to the fourth embodiment has the first communication section 10 and the second communication section 20 similarly to the communication apparatus 3 according to the second embodiment (see FIG. 6). The respective constitutions of the first communication section 10 and the second communication section 20 are formed as follows.

That is to say, the substrate 25 includes an insulating layer 63 formed by an insulating material and a conductive ground layer 64 which is grounded, and respective layers are laminated. The stub 23 is laminated on the insulating layer 63. The stub 23 is grounded with the ground layer 64 via a through hole (not shown) formed on the insulating layer 63 of the substrate 25 so as to short out. The ground layer 64 operates as a ground of the stub 23 and serves also as a shield which represses the influence on the antenna coil 11 due to a magnetic field or the like from another metal part.

On the other hand, the antenna coil 11 or the coupling electrode 21 is formed on upper and lower surfaces of a second substrate 61 formed by an insulating material according to etching, for example. When the antenna coil 11 is arranged on the upper surface, the efficiency of the magnetic field coupling by means of the antenna coil 11 can be heightened. When the coupling electrode 21 is arranged on the lower surface, the connection between the coupling electrode 21 and the stub 23 is facilitated, and a manufacturing step can be made to be easy. That is to say, the coupling electrode 21 and the stub 23 are connected by the connection signal line 22, but the connection signal line 22 is composed of a pin with a spring. The second substrate 61 is laminated on a position on the substrate 25 separated by a predetermined distance. As a result, the spin (connection signal line 22) is pushed against the coupling electrode 21 by an elastic force of the spring, and the coupling electrode 21 is electrically connected to the stub 23 via the pin.

A magnetic material layer 62 with high permeability formed by a magnetic body is formed between the substrate 25 and the second substrate 61. The magnetic material layer 62 serves as a spacer between the substrate 25 and the second substrate 61, and also secures a passage of the magnetic field H generated by the antenna coil 11 as shown in FIG. 10. When the magnetic field H is concentrated on magnetic material layer 62, the property of the antenna coil 11 (for example, coupling property) can be maintained satisfactorily. When a thickness of the magnetic material layer 62 is adjusted, a distance between the stub 23 and the coupling electrode 21 can be adjusted accurately. For this reason, the manufacturing accuracy can be also heightened.

It goes without saying that also the communication apparatus 6 according to the fourth embodiment having the above constitution can solve the issue of the antenna efficiency and the issue of the S/N ratio by means of the functions similar to those of the communication apparatuses 1, 3 and 5 according to the first to third embodiments, namely, produces the effects of the communication apparatuses 1, 3 and 5 according to the first to third embodiments.

It should be understood by those skilled in the art that various modifications, combinations, sub-combinations and alterations may occur depending on design requirements and other factors insofar as they are within the scope of the appended claims or the equivalents thereof.

For example, the above embodiments describe that the communication apparatus has the two communication systems. That is to say, the first communication section 10 and the second communication section 20 can operate independently, and transmit and receive different signals. However, the present invention is not limited to these examples. For example, the first communication apparatus 10 and the second communication apparatus 20 can be cooperative with each other. That is to say, for example, the first communication section 10 and the second communication section 20 can transmit the same information. When the first communication section 10 and the second communication section 20 transmit/receive the same information, redundant one communication system can be constituted.

The above embodiments describe the single communication apparatus. However, in the case of the first embodiment, contactless communication is made as shown in FIG. 2 or the like, so that the communication apparatus 1 on the transmission side and the communication system 2 on the reception side can certainly constitute one system.

What is claimed is:

1. A communication apparatus, comprising:

a first communication section which makes contactless communication by means of magnetic field coupling; and a second communication section which is arranged in a magnetic field generated by the first communication section and makes contactless communication by means of electric field coupling, wherein the second communication section generates an electric field which oscillates to a direction approximately parallel with an oscillation direction of the magnetic field on a position where the magnetic field crosses the second communication section, and wherein the second communication section has a flat-shaped electric field coupling electrode which couples the electric field and has slits formed radially from its center.

2. The communication apparatus according to claim 1, wherein the first communication section has an antenna coil which couples the magnetic field, and the electric field coupling electrode is arranged so that at least one part of magnetic flux generated by the antenna coil crosses the electric field coupling electrode vertically.

3. The communication apparatus according to claim 2, wherein the antenna coil and the electric field coupling electrode are arranged on an approximately same plane.

4. The communication apparatus according to claim 3, wherein the electric field coupling electrode is arranged on a center of the antenna coil.

5. The communication apparatus according to claim 1, wherein the first communication section receives authentication data for authenticating a communication apparatus as a communication partner from the communication apparatus as the communication partner, and the second communication section transmits predetermined data to the communication apparatus as the communication partner according to the authentication data.

6. A communication method comprising the steps of:

generating a magnetic field in order to make contactless communication by means of magnetic field coupling;

generating an electric field in the magnetic field in order to make contactless communication by means of electric field coupling; and generating the electric field so that the electric field oscillates to a direction approximately parallel with an oscillation direction of the magnetic field on a generation position of the electric field, wherein a flat-shaped electric field coupling electrode makes the contactless communication by means of the electric field coupling, the electric field coupling electrode having slits formed radially from its center.

7. An antenna module, comprising:

an antenna coil which makes contactless communication by means of magnetic field coupling; and a flat-shaped electric field coupling electrode which is arranged in a magnetic field generated by the antenna coil and makes contactless communication by means of electric field coupling, the electric field coupling electrode having slits formed radially from its center, wherein the electric field coupling electrode generates the electric field which oscillate to a direction approximately parallel with an oscillation direction of the magnetic field on a position where the magnetic field crosses the electric field coupling electrode.

8. A communication system, comprising:

two communication apparatuses which have a first communication section which makes contactless communication due to magnetic field coupling and a second communication section which makes contactless communication by means of electric field coupling, wherein in the communication apparatus on a transmission side:

the first communication section generates a magnetic field in order to couple the magnetic field; and the second communication section is arranged in the magnetic field generated by the first communication section and generates an electric field which oscillates to a direction approximately parallel with an oscillation direction of the magnetic field on a position where the magnetic field crosses the second communication section, and wherein the second communication section has a flat-shaped electric field coupling electrode which couples the electric field and has slits formed radially from its center.

* * * * *